United States Patent [19]
Hagqvist

[11] Patent Number: 5,401,403
[45] Date of Patent: Mar. 28, 1995

[54] MEMBRANE MODULE AND A METHOD FOR ITS MANUFACTURE

[75] Inventor: Peter Hagqvist, Älvsjö, Sweden

[73] Assignee: AB Electrolux, Stockholm, Sweden

[21] Appl. No.: 123,896

[22] Filed: Sep. 20, 1993

[30] Foreign Application Priority Data

Sep. 28, 1992 [SE] Sweden ................................ 9202790

[51] Int. Cl.⁶ .............................................. B01D 63/14
[52] U.S. Cl. ................................ 210/247; 210/321.86; 210/487
[58] Field of Search .................... 210/340, 341, 321.84, 210/232, 347, 247, 321.86, 321.77, 493.3, 493.1, 493.5, 487

[56] References Cited
U.S. PATENT DOCUMENTS 4,597,868 7/1986 Watanabe ........................... 210/232

Primary Examiner—Frank Spear
Attorney, Agent, or Firm—Cushman Darby & Cushman

[57] ABSTRACT

A method of producing a fluid purifier membrane module, sheets of membrane material are disposed in layers with intermediate spacer elements in a manner to obtain mutually alternating spaces for contaminated and purified fluid respectively. Mutually adjoining sheets of membrane material (12) are joined together in pairs in a manner to obtain membrane units (10) which include closed cavities (28). The membrane units (10) with associated spacer elements (18, 34) are arranged in a stack. The mutually facing outer surfaces of the membrane units are joined together in zones and in a fluid-tight fashion along at least one line (36) which extends through the walls of the membrane units. The membrane units are perforated along the line in a manner to obtain through the membrane units a passageway (32) which communicates with the cavities (28).

5 Claims, 2 Drawing Sheets

MEMBRANE MODULE AND A METHOD FOR ITS MANUFACTURE

BACKGROUND OF THE INVENTION

The present invention relates to a method of producing a membrane module for fluid purifiers, wherein sheets of membrane material are disposed in layers with spacing elements placed therebetween, such as to obtain respective mutually alternating spaces or cavities in which contaminated and purified fluid are accommodated. The invention also relates to a membrane module produced in accordance with the method.

According to one known method, the module is constructed of flat membrane sheets stretched between rigid support frames. Although this known method can be mechanized to a large extent, the resultant modules have low volume efficiency (active membrane surface area/module volume), primarily due to the thickness and sealing efficiency of the rigid frames.

According to another known method, the membrane module is produced by helically winding a plurality of membrane envelopes around a permeation tube. Although this method produces modules which have a high volume efficiency, it can only be mechanized to a small extent, since the task of helically winding and gluing the membrane envelopes must be carried out with extreme care in order to avoid folds and wrinkles on the inner surfaces of the envelopes, such folds and wrinkles causing the membrane material to rupture and therewith render it useless.

Another problem encountered with these and other known membrane modules is the difficulty of readily placing the large number of spaces intended for accommodating purified fluid in fluid-tight communication with a fluid purifier outlet line that is common to all these spaces.

SUMMARY OF THE INVENTION

Accordingly, an object of the present invention is to provide an improved membrane module and an improved method of the kind defined in the introduction which can be extensively mechanized, which will provide membrane modules of high volume efficiency, and with which the spaces intended for the purified fluid can be readily connected to an outlet line.

According to one aspect of the invention, mutually adjacent sheets of membrane material are joined together in pairs to obtain a membrane unit which includes closed cavities, whereafter the membrane units are arranged in a stack. The mutually facing outer sides of the membrane units are then joined together at spaced zones or regions and in a fluid-tight fashion along at least one line which extends through the stack. The membrane units are then perforated along the line in a manner to obtain through the membrane units a passageway which communicates with the cavities.

A high degree of mechanization can be achieved when the membrane units are formed continuously from a web of membrane material and the stack is created by multiple folding of the membrane units, since only one or a pair of web sections of membrane material need be worked and handled, for instance need be spot-welded and welded along longitudinal and transversal seams and folded during the manufacturing process.

When the width of the membrane units is varied to obtain a stack of circular cross-section, the module can be adjusted to the shape of standardized pressure vessels for membrane modules.

BRIEF DESCRIPTION OF THE DRAWINGS

Other features of the invention and advantages afforded thereby will be evident from the following detailed description of a preferred exemplifying embodiment of the invention with reference to the accompanying drawings, in which.

DETAILED DESCRIPTION

Figure 1:
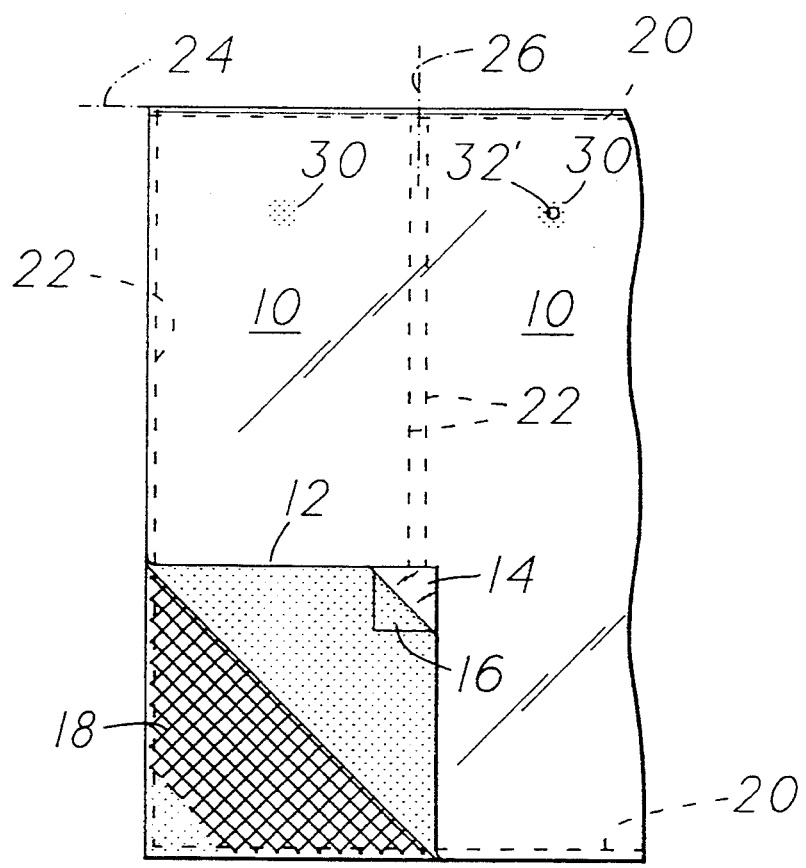
FIG. 1 illustrates an end piece of a spread-out membrane module according to the invention, with parts of the module cut away and other parts folded up.

The out-spread membrane module of the embodiment illustrated in FIG. 1 is produced from a web of membrane material 12 which includes a thin membrane layer 14, for instance an osmosis material, which is joined to a thicker carrier sheet 16, for instance a sheet of nonwoven material, to form a laminate. In the illustrated example, the web of membrane material 12 is folded in the longitudinal direction of the web along a line 24, so as to obtain a double-layer membrane web. As will be understood, the double-layer membrane web may also be formed by placing two webs of membrane material one upon the other.

Figure 3:
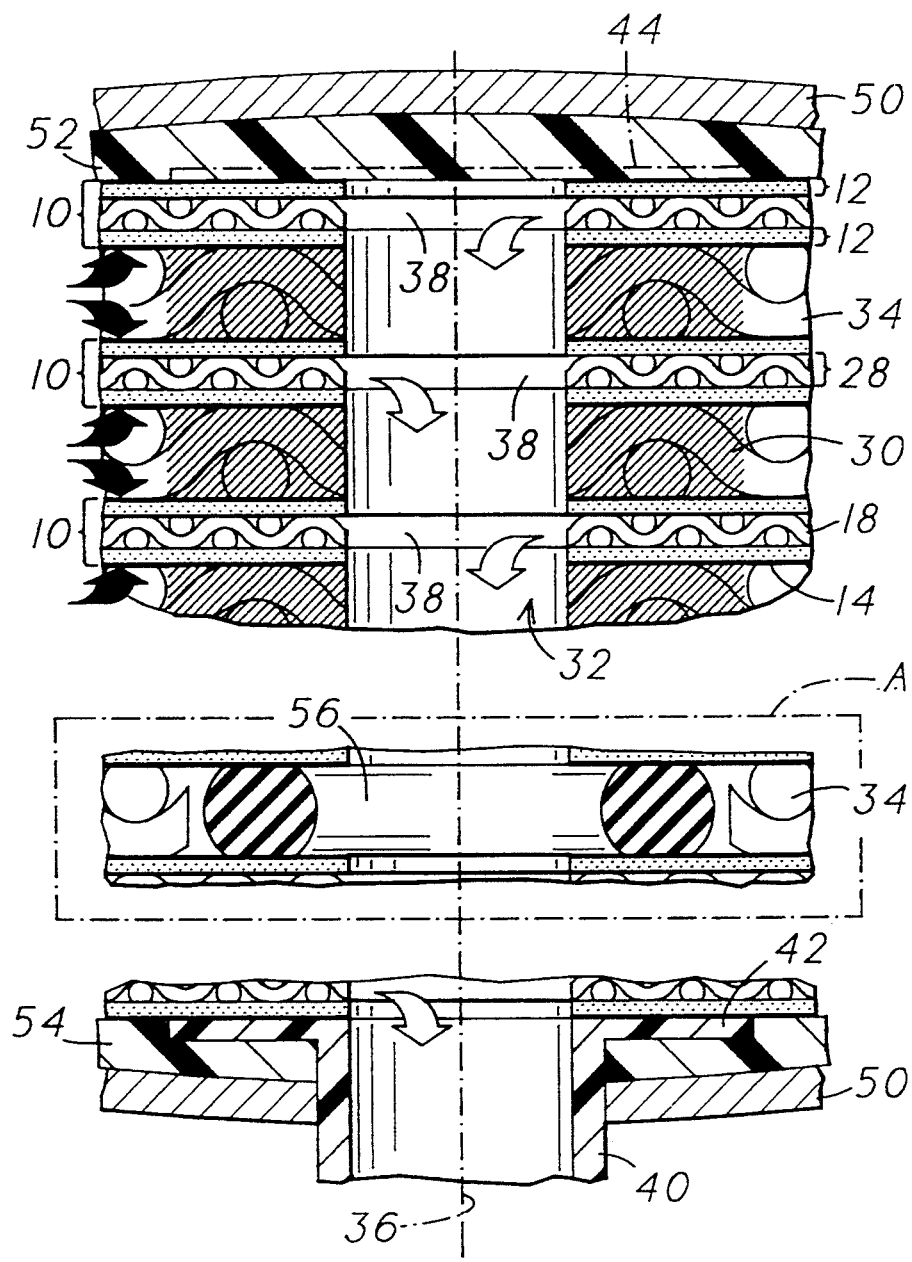
FIG. 3 is a schematic cross-sectional view in larger scale of a membrane module fitted to a pressure vessel, with parts of the module removed for illustration purposes.

Placed between the two layers of the membrane web is a fluid permeable spacer sheet 18, which is also in web form and has a net or grid-like structure. The double-layer membrane web and the spacer sheet 18 enclosed therebetween are then joined together and sealed by welding, fusing, melt-gluing, gluing or taping the layers and sheet together along joining lines 20 and 22 in a manner to obtain a plurality of web-like, continuous membrane units 10, each having a closed cavity 28 (FIG. 3). The cavities 28 are thus delimited from the outer surfaces of the membrane material 12 and form spaces for the purified fluid or the fluid that is able to permeate through the membrane material 12 when a pressurized fluid acts on the outer surfaces of the material.

The continuous string of membrane units 10 produced in the aforedescribed manner are then arranged in stacks, by folding the string of membrane units 10 towards one another along fold lines 26 that extend between adjacent transverse connecting lines 22. By positioning the fold lines 26 between the mutually adjacent joining lines 22, 22 and in spaced relationship with the lines, there is no risk that any rupture that may occur in the thin membrane layer 14 as a result of folding the layer will propagate to the actual membrane units 10. Although not shown, it is probable that the fold lines can be placed directly coincidental with a joining line or weld.

Figure 2:
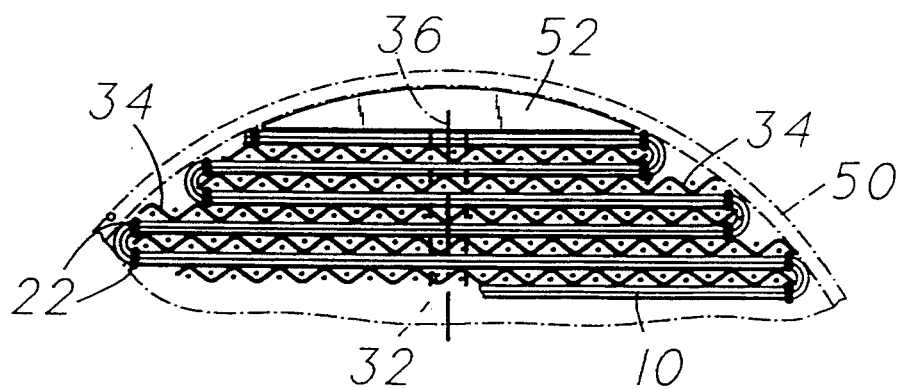
FIG. 2 is an end view of part of a completed membrane module.

Additional fluid permeable spacer sheets 34 are placed between the mutually facing outer surfaces of the membrane units 10 in the thus formed stack (FIGS. 2 and 3). Similar to the earlier described spacer sheets 18, the function of the further spacer sheets 34 is to hold the adjacent or adjoining sides of the membrane material 12 spaced from one another in the completed membrane module, so as to permit fluid to flow therebetween.

As the membrane units 10 are folded, the mutually adjoining outer surfaces of the units are joined together at regions 30 in a fluid-tight and zone-wise fashion, said regions 30 lying on a line 36 which extends through or transversely to the completed stack. As when joining the material along the lines 20 and 22, joining of said adjacent outer surfaces can be effected by welding, melt-fusion, melt-gluing, gluing or taping. As will be evident from FIG. 3, each joining region or zone 30 extends through the thickness of associated spacer sheets 34. As shown in the framed region A in FIG. 3, the spacer sheets 34 may, alternatively, be provided beforehand with circular apertures around the line 36 in which O-rings 56 or optionally flat seals (not shown) are placed, these sealing devices, in turn, being clamped between the outer sides of the membrane units 10 in response to a pressure force applied externally to the stack, and therewith provide a fluid-tight join between the units.

Subsequent to joining together the outer sides of the thus stacked membrane units 10 in the regions or zones 30, a throughpassing passageway 32 is formed through the membrane units along the line 36 that extends through the centre points of the joins 30. The passageway 36 can be provided in any suitable manner, for instance by punching or drilling, provided that the connections 38 to the closed cavities 28 formed by such perforation do not become blocked. This can be achieved by alternatively preparing the passageway 32 in a manner to provide openings 32' (FIG. 1) separately in the membrane material 12 prior to folding the material to the completed stack.

The aforedescribed method steps in the manufacture of a membrane module are highly suited to a fully mechanized production process, which can be carried out roughly in accordance with the following non-limiting example: The webs of membrane material and spacer material (permeation spacers) 12, 18, 12 taken from respective rolls of material and mutually combined are first provided with the longitudinally extending and transversely extending joins 20 and 22, for instance in a welding station. Glue zones are then applied to the planned regions 30 on the outer surfaces of the membrane units. Ready-cut and optionally perforated (around the patches 30) pieces of spacer material (feed spacers) 34 are then positioned between adjoining membrane units 10, 10, whereafter these units are folded against one another and compressed so as to harden the joins 30. Finally, the completed membrane stack is drilled along the line 36 to provide the passageway 32.

One open end of the passageway 32, or possibly both ends of the passageway, is/are connected to a connection pipe 40 (FIG. 3) which leads to an outgoing permeation fluid conduit (not shown), the conduit being connected in a suitable fluid-tight fashion to the associated outer side of an outer membrane unit 10. In the case of the FIG. 3 embodiment, the connector pipe 40 is provided with a flange 42 which is glued to a perimeter area of said outer surface around the mouth of the passageway 32. In the illustrated case, in which only one permeation fluid conduit shall be connected to the membrane module, the other orifice of the passageway 32 is sealed in a suitable manner by means of a fluid-tight plate or cloth 44 or some like device, as indicated in chain lines in FIG. 3.

The completed membrane module is intended to be placed within a pressure vessel 50 of a fluid purifier (not shown), for instance a water purifier of the RO-type (reversed osmosis). In this case, the fold lines 26 are conveniently placed so that the completed membrane module will obtain a circular cross-section which coincides with the shape of the pressure vessel 50. Equalizing pieces 52, 54 of circular-segmental cross-section may optionally be mounted at the ends of the stack cross-section, wherein the flat sides of the equalizing pieces that face towards the membrane module function to hold the module in position with possible pressure force in the pressure vessel 50.

The described inventive membrane module is intended to operate in the following manner when installed in the pressure vessel 50:

A flow of pressurized fluid to be cleansed or purified is introduced axially into the elongated pressure vessel 50 through an inlet conduit, not shown. The pressurized fluid enters the module and penetrates to the outer sides of the membrane units 10, through the fluid permeable spacer sheets 34. As illustrated by the full arrows in FIG. 3, the pressurized fluid acts on all exposed outer surfaces of the membrane material 12, wherein the membrane sheet 14 (FIG. 1) allows permeation fluid or purified fluid to pass through to the cavities 28 of the membrane units 10 as a result of, for instance, reversed osmosis or some other filter effect, depending on the structure of the membrane layer. As indicated by the empty arrows in FIG. 3, purified fluid can only flow out to the passageway 32 through the connections 38, and exits from the pressure vessel through the fluid conduit 40 as process flow. That part of the axial flow through the pressure-vessel cross-section that is unable to penetrate through the membrane layer will exit as reject flow to the pressure vessel 50 outlet conduit, in a known manner not shown.

It is claimed:

1. A method for producing a fluid purifier membrane module having a membrane material disposed in layers with alternating first and second spacers placed therebetween forming mutually alternating spaces in the purifier for receiving respective unpurified and purified portions of a fluid to be purified in the purifier, said method comprising the steps of:

disposing a pair of flexible web portions of said membrane material face to face with said first spacer placed between the web portions;

joining together said pair of flexible web portions to produce a continuous line of membrane units each having a closed cavity enclosing said first spacer;

arranging the membrane units in a stack by multiple-folding said continuous line of membrane units and placing said second spacer between each fold of said multiple folding;

joining together mutually facing outer sides of the membrane units in zones and in a fluid-tight manner along at least one line extending through walls of the membrane units in the stack; and forming a bore through the membrane units along said line for obtaining through the membrane units a passageway serially connecting said closed cavities.

2. The method of claim 1 further comprising:
varying the width of the membrane units in a manner to obtain a stack of circular cross-section.

3. The method of claim 1 wherein:

said bore through the membrane units is formed by forming a bore through each said membrane unit prior to arranging the membrane units in said stack.

4. A fluid purifier membrane module, comprising:

a pair of flexible web portions of membrane material disposed face to face, with a layer of a first spacer sandwiched therebetween, said web portions being permetrically joined and also joined to one another along a plurality of longitudinally spaced transversally extending joints, thereby providing a plurality of membrane units disposed in a first line, each having a respective closed cavity enclosing a respective increment of said first spacer between increments of said pair of web portions;

said line of membrane units being folded back and forth upon itself at respective folds so as to provide a stack of said membrane units;

a second spacer having respective increments thereof disposed within said stack between each said fold in said stack;

said flexible web portions being locally joined throughout said stack along a second line extending thicknesswise through said stack and said units so as to provide a passageway extending along said second line, whereby said first and second spacers form mutually alternating spacers in said stack for respectively receiving unpurified and purified portions of a fluid to be purified in a purifier using said membrane module.

5. The fluid purifier membrane module of claim 4, wherein:

said line of membrane units are folded back and forth zigzag fashion, and outer faces of facially adjoining increments of said flexible web portions of said membrane material are joined together, thereby uniting said stack.

* * * * *